(12) United States Patent
Zahm et al.

(10) Patent No.: US 7,539,469 B2
(45) Date of Patent: May 26, 2009

(54) INPUT CONTROL SYSTEM FOR HIGH FREQUENCY RECEIVER

(75) Inventors: Michael Zahm, Waldbronn (DE); Achim Ratzel, Karlsbad-Spielberg (DE); Stefan Köhler, Keltern (DE)

(73) Assignee: Harman Becker Automotive Systems GmbH (DE)

( * ) Notice: Subject to any disclaimer, the term of this patent is extended or adjusted under 35 U.S.C. 154(b) by 553 days.

(21) Appl. No.: 11/299,314

(22) Filed: Dec. 9, 2005

(65) Prior Publication Data

US 2006/0154629 A1 Jul. 13, 2006

(30) Foreign Application Priority Data

Dec. 9, 2004 (EP) .................................. 04029226

(51) Int. Cl.
*H04H 1/00* (2006.01)
*H04B 17/02* (2006.01)
(52) U.S. Cl. ....................... 455/130; 455/3.02; 455/136; 455/232.1
(58) Field of Classification Search ........ 455/3.01–3.06, 455/132–140, 232.1–252.1; 348/731, 735
See application file for complete search history.

(56) References Cited

U.S. PATENT DOCUMENTS

| 4,237,490 | A | | 12/1980 | Harford |
|---|---|---|---|---|
| 6,188,447 | B1 | | 2/2001 | Rudolph et al. |
| 6,353,463 | B1 | * | 3/2002 | Seo ............................. 348/731 |
| 6,757,029 | B2 | * | 6/2004 | Kurihara ..................... 348/731 |
| 6,980,769 | B2 | * | 12/2005 | Toporski ..................... 455/3.01 |
| 7,050,119 | B2 | * | 5/2006 | Masuda ....................... 348/731 |
| 7,133,081 | B2 | * | 11/2006 | Ina et al. ..................... 348/678 |
| 7,164,894 | B2 | * | 1/2007 | Nagahama et al. ........ 455/168.1 |
| 7,224,939 | B2 | * | 5/2007 | Takayama et al. ............. 455/45 |
| 2002/0008787 | A1 | | 1/2002 | Kurihara |
| 2002/0118313 | A1 | | 8/2002 | Zahm et al. |
| 2004/0097209 | A1 | * | 5/2004 | Haub et al. .............. 455/242.1 |

FOREIGN PATENT DOCUMENTS

EP 0 571 790 B1 2/1999

* cited by examiner

*Primary Examiner*—Simon D Nguyen
(74) *Attorney, Agent, or Firm*—Brinks Hofer Gilson & Lione

(57) ABSTRACT

A receiver may receive and process broadcasting signals in digital and analog forms. The receiver may include an amplifying input stage, a digital signal processing stage and an analog signal processing stage. The input stage may receive a broadcast signal. The digital signal processing stage may process a received broadcast signal and output a first quality information signal. The analog signal processing stage may process a received analog broadcast signal and outputs a second quality information signal. An evaluation unit may evaluate at least one of the first and second quality information signals and output a control signal to the amplifying input stage.

21 Claims, 3 Drawing Sheets

INPUT CONTROL SYSTEM FOR HIGH FREQUENCY RECEIVER

BACKGROUND OF THE INVENTION

1. Priority Claim

This application claims the benefit of priority from European Patent Application No. 04029226.0, filed Dec. 9, 2004, which is incorporated by reference.

2. Technical Field

The invention relates to a receiver system and more particularly, to an input control system for a high frequency receiver.

3. Related Art

Digital broadcasting has developed rapidly along with conventional analog broadcasting. Currently, wide selection of digital broadcast channels may not be available for various reasons such as governmental regulations. Thus, hybrid TV receivers may provide advantages that allow viewer to watch both analog broadcasting and digital broadcasting. Hybrid TV receivers may receive both analog and digital signals and process them.

TV receivers may be installed in vehicles so that passengers can watch live broadcasts while traveling. For instance, passengers may seamlessly watch worldwide news on the road. Vehicles may be required to have receivers that provide a good quality reception signal. The received signal may need protection from interference originating from RF frequencies of other channels. A strong neighboring channel may further weaken the received signal.

SUMMARY

A high frequency receiver may receive and process both analog and digital broadcast signals. The receiver may include an input stage that receives the broadcast signals. The receiver also may include a digital signal processing stage, an analog signal processing stage and an evaluation unit. The digital signal processing stage may process the digital broadcast signal and output a first quality information signal. The analog signal processing stage may process the analog broadcast signal and output a second quality information signal. The evaluation unit may evaluate at least one of the first and second quality information signals and output a control signal to the input stage.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
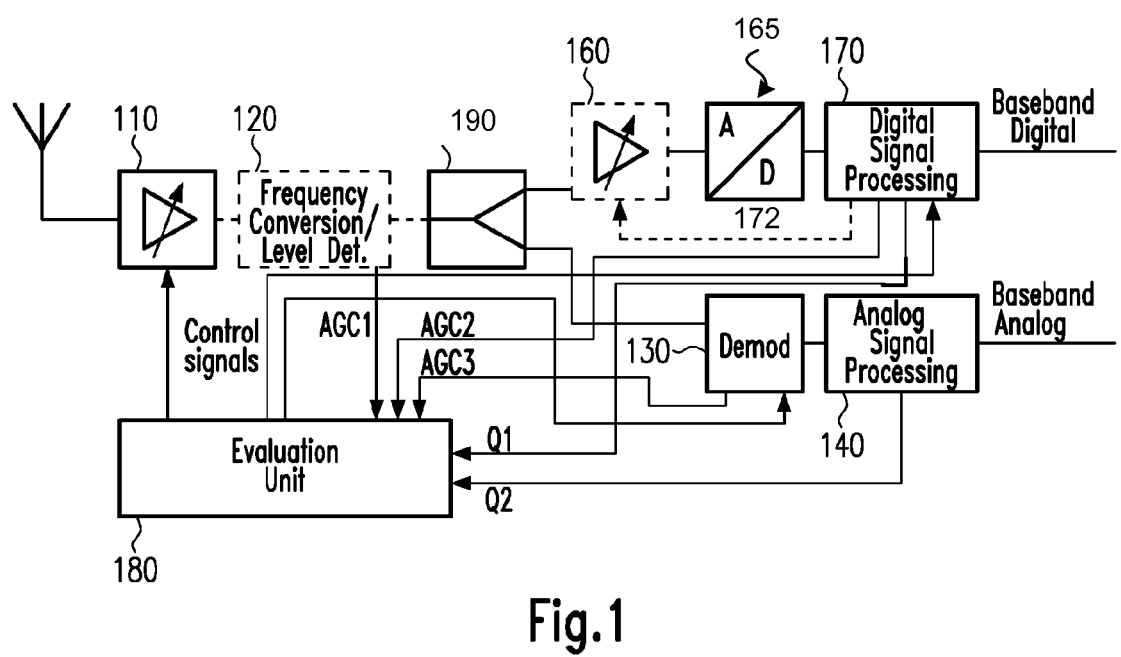
FIG. 1 is a block diagram of a receiver.

FIG. 1 is a block diagram illustrating one example of a receiver 100 such as a high frequency mobile receiver. In receivers, automatic gain control (AGC) may play a vital role in obtaining a good quality reception signal. An AGC circuit automatically controls the gain of an amplifier. Accordingly, the level of an output signal may be constant when the level of an input signal may vary. When used in a TV receiver, an AGC circuit may automatically control an RF gain of an RF amplifier. The RF amplifier may be used in a tuner of the TV receiver. Further, the AGC circuit may control an intermediate frequency (IF) gain of an IF amplifier. The IF amplifier may be connected to the output end of the tuner of the TV receiver. As a result, the AGC circuit may maintain the level of a reproduced video signal constant, although the level of a received broadcasting signal may vary.

In FIG. 1, the receiver 100 may include an input stage 110, a frequency converter/broadband level detector 120, an analog demodulator 130, an analog signal processing unit 140, a tunable amplifier 160 and a digital modulation processing unit 170. The receiver 100 also may include an evaluation unit 180 and a switch or splitter 190. The input stage 110 may receive a radio frequency signal. The received signal may be in digital form or analog form. The input stage 110 may include a tuner. The tuner may be any device for tuning, especially an electronic circuit or device used to select signals at a specific radio frequency for amplification. Alternatively, the input stage 110 may have a tuner-free design. The input stage 110 may amplify the received signal.

The frequency converter/broadband level detector 120 may detect and determine the level or amplitude of a TV signal. The amplitude of the TV signal may be used to determine whether the reception is able to provide a good display on a TV screen. The frequency converter/broadband level detector 120 may output intermediate frequency (IF) signals.

The splitter 190 may switch between analog demodulation and processing and digital demodulation and processing, depending on whether the received signal is analog or digital. If the signal is an analog broadcast signal, the IF signals from the detector 120 may be fed to the analog demodulator 130. The IF signals may pass through a Surface Acoustic Wave (SAW) filter to reduce any unwanted sidebands in the signal. Alternatively, various other filters are possible. From the analog demodulator 130, an automatic gain control signal AGC3 may be output to the evaluation unit 180. The IF signal may be provided and further processed in the analog signal processing unit 140 before the processed signal may be displayed as a picture to a viewer. The analog signal processing unit 140 also may output a quality information signal Q2 to the evaluation unit 180. The quality information signal Q2 may include information on SNR, and/or information on adjacent channel disturbances and multi-path interference. This quality information contained in the quality information signal Q2 is provided to the evaluation unit 180. A baseband analog video signal may be output from the analog signal processing unit 140.

If the signal is a digital signal, it may enter the SAW filter or a different type of filter to reduce any unwanted sidebands in the signal. Subsequently, the tunable amplifier 160 may amplify the filtered digital signal. An analog/digital converter 165 may be placed between the tunable amplifier 160 and the digital modulation processing unit 170. The A/D converter 165 may be included in a digital receiver and convert analog format to digital format. The digital demodulation processing unit 170 may demodulate the digital signal. The digital modulation processing unit 170 may include a Coded Orthogonal Frequency Division Multiplexing (COFDM) demodulator, which is often for use with a digital TV. Alternatively, other standards are also possible. The digital modulation processing unit 170 may supply a tuning signal 172 for the tunable amplifier 160. A baseband digital video signal may be output from the digital modulation processing unit 170.

The digital modulation processing unit 170 may output a quality information signal Q1 and an automatic gain control signal AGC2 to the evaluation unit 180. This quality information signal Q1 may include a Bit Error Rate (BER), a Modulation Error Rate (MER), a Carrier-to-Noise Ratio (CNR) and various MPEG (Motion Pictures Experts Group) transport stream errors.

The evaluation unit 180 may analyze the quality information signals Q1 and Q2 and automatic gain control signals AGC2 and AGC3. The first quality information signal and the second quality information signal may include at least signal strength information of the received broadcast signal. The automatic gain control signal AGC2 and AGC3 may include at least information that represents optimal gains for the received broadcast signals. The evaluation unit 180 may generate control signals CS to regulate the input stage 110 as well as the analog demodulator 130 and the digital modulation processing unit 170. The evaluation unit 180 may use any quality information contained in the signals Q1 and Q2 for determining amplification of the required broadcast signal, if the interference of the neighboring channels or foreign channels may be ignored and the maximum IF level may not exceed the upper limit.

The automatic gain control signals AGC1-AGC3 may be output by the analog demodulator 130, the digital modulation processing unit 170 and the detector 120 and may be used in generating control signals in the evaluation unit 180. These control signals may control the input at the input stage 110 to the detector 120 as well as the analog demodulator 130 and the digital modulation processing unit 170.

The evaluation unit 180 also may receive inputs from the digital modulation processing unit 170 in the form of the automatic gain control signal AGC2 and from the analog demodulator 130 in the form of the automatic gain control signal AGC3. The automatic gain control signals AGC1-AGC3 from the level detector 120, the digital modulation processing unit 170 and the analog demodulator 130 may be evaluated together with the quality information signals Q1 and Q2 from the digital modulation processing unit 170 and the analog signal processing unit 140 in the evaluation unit 180, which then outputs the control signals.

The receiver 100 may enhance the quality of the received analog and/or digital signal and improve the signal-to-noise ratio in the received signals. The quality information of the received signal may be used to control the amplifying stage of the signal path in specific situations where the field strength is high. The input stage 110 may be followed by both the digital signal processing stage and the analog signal processing stage, which may process the received TV signal and output the first and second quality information signals Q1 and Q2, respectively. The evaluation unit 180 may evaluate the quality information signals Q1 and Q2 and output the control signals for the input stage 110 as well as control signals for the digital and analog signal processing units 140 and 170.

The level detector 120 may detect the level of the TV signal and provide the detected level as an input AG1 to the evaluation unit 180 for further processing. The evaluation unit 180 further may consider the first automatic gain control signal AG1, the second automatic gain control signal AG2, and the third automatic gain control signal AG3 in its evaluation. The evaluation unit 180 may provide advantages that the control signal for the amplifying input stage 110 may be based on a variety of signals and therefore, its limited dynamic range may be optimized. Additionally, the evaluation unit 180 may output different control signals to the amplifying input state 110 such that the best signal may be selected depending on circumstances. These signals may include a variable level control signal and/or a dynamic control signal.

The evaluation unit 180 also may output the control signals directly to the digital signal processing stage 170 or the analog demodulation stage 130 such that the control signals may be adjusted and operate in an efficient manner. The tunable amplifier 160 at the input of the digital modulation processing unit 170 provide advantages that the signal at the right level may be always input to the digital demodulation processing unit 170. The amplifying input stage 110 may be tunable. Thus, if a tuner is needed, one tuner may handle various ranges of frequency. No different tuners for every required frequency may be required.

As described above, the evaluation unit 180 may use the quality information of the received signal to control the input stage of the receiver 100. No interferences may be generated in the frequency band of the reception signal when a strong signal is present. No change of the signal-to-noise ratio may be needed.

Alternatively, a software defined radio ("software radio") is possible in the analog or digital path of the receiver 100. Software radio is a technology that implements radio functions as software modules. Software radio may use programmable hardware modules used in digital radio systems at different functional levels. Software radio technology may build in a radio system such as modulation/demodulation, signal generation, coding and link-layer protocols in software. Radio systems may be reconfigurable because dynamic selection of parameters for the functional modules is possible.

Figure 2:
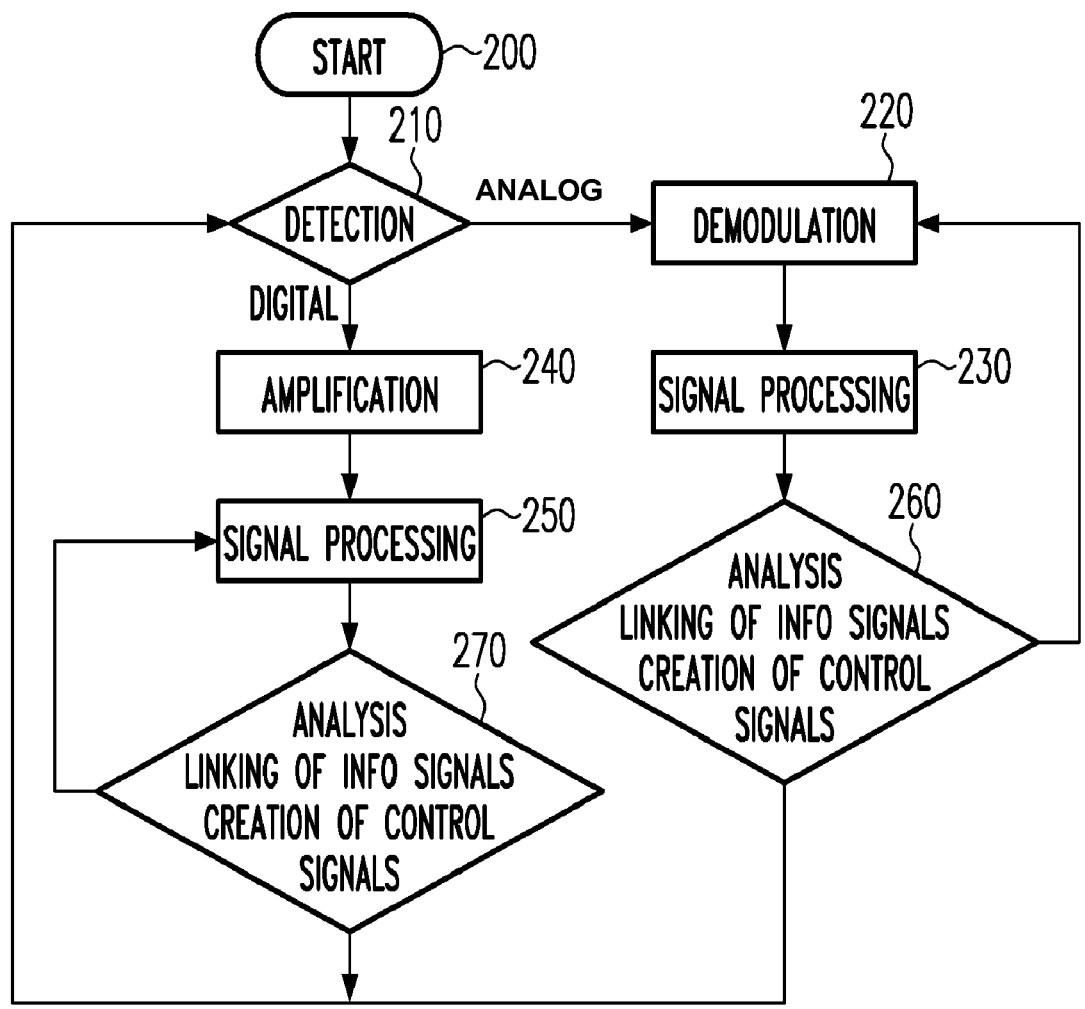
FIG. 2 is a flowchart illustrating the operation of the receiver of FIG. 1.

FIG. 2 is a flowchart illustrating the operation of the receiver 100 of FIG. 1. The receiver 100 may be switched on (200). The input stage 110 receives the broadcast signals (205) and the broadcasting signals may be detected and selected (210), either manually or automatically. If the signal may be an analog signal, the analog demodulator 130 may demodulate the signal (220). The analog signal processor 140 may process the demodulated analog signal (230) prior to analysis at 260.

If the signal is a digital signal (at 210), the tunable amplifier 160 may amplify the signal (240). The digital modulation processing unit 170 may process the amplified signal at 250 prior to processing at 270.

The processing at 260 and 270 may include analysis of the signal, linking of quality information signals as well as generation of the control signals in the evaluation unit 180. The control signals may be fed back to control the detection stage at 210. This feedback loop may ensure that the used broadcast signal have the best quality even around strong neighboring channels.

After the demodulation at 220 and the signal processing at 230 of the analog signal, the quality information signal Q2 and the automatic gain control signal AGC3 may be analyzed and linked at the processing at 260. The control signal for the analog demodulator 130 may be generated and used to control the demodulation 220 of the analog signal path.

In the digital signal path, the received digital broadcast signal may be first amplified (240) and then processed at 250 prior to the analysis at 270. The quality information signal Q1 and automatic gain control signals AGC2 also may be linked to generate the control signal for the digital signal processing (250). A direct link is available to improve the process of digital signal processing. Prior to the detection (210), the additional signal AGC1 may be generated and be input to the evaluating unit 180. The analysis at 260 and 270 may link the quality information signal Q2 output from the analog signal processing unit 140 with the automatic gain control signal AGC3.

Figure 3:
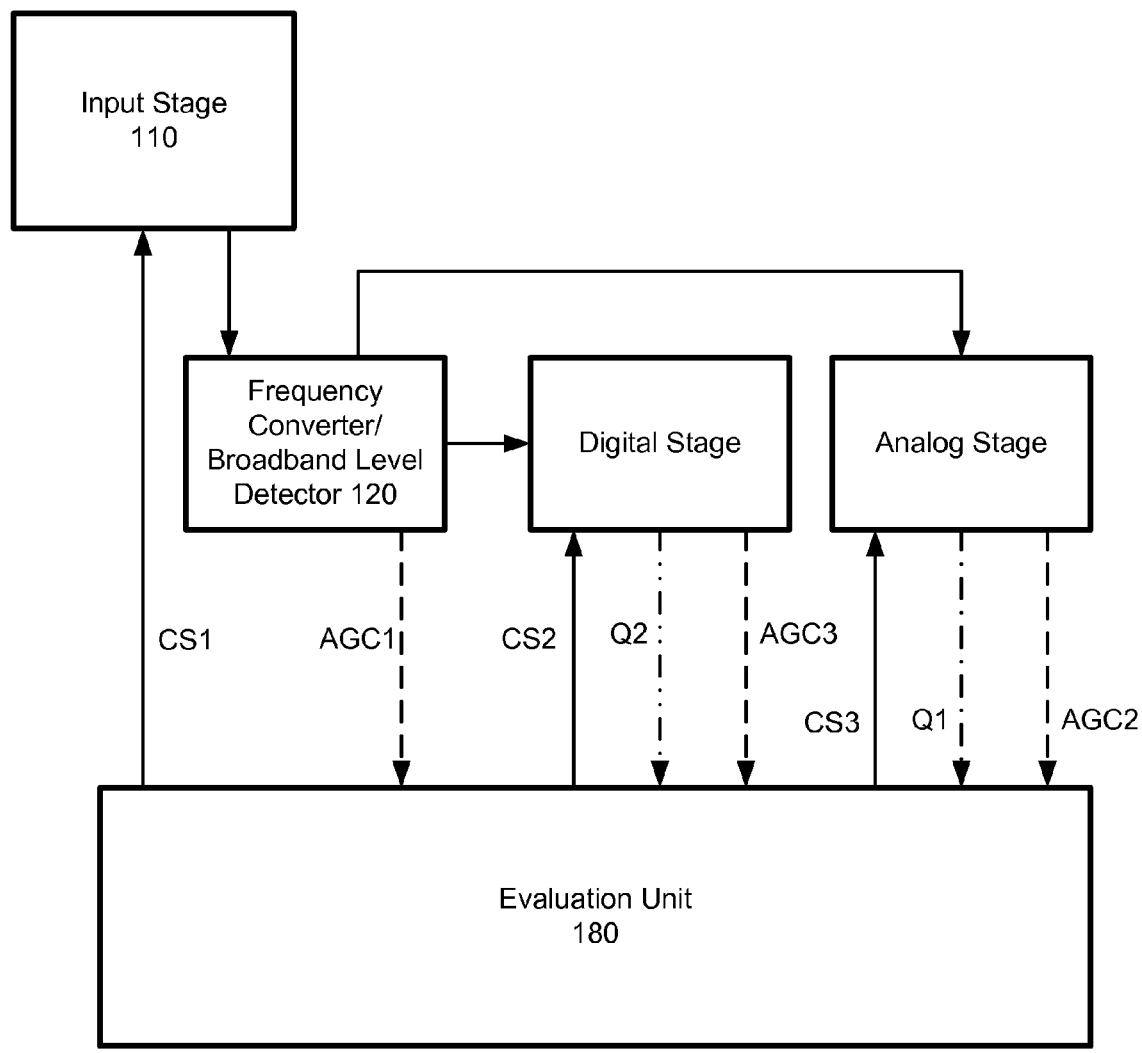
FIG. 3 illustrates signal flow of the receiver of FIG. 1.

FIG. 3 illustrates an exemplary signal flow in the receiver 100 of FIG. 1. The evaluation unit 180 may receive two different types of signals. One type of signal may include the quality information signals Q1 and Q2. The other type of signal may include the automatic gain control signals, AGC1, AGC2 and AGC3. The evaluation unit 180 generates and provides control signals CS1, CS2 and CS3. A first control signal CS1 is provided to the input stage 110. The second control signal CS2 is provided to a digital stage and the third control signal CS3 is provided to an analog stage. The digital stage may include the digital modulation processing unit 170. The analog stage may include the analog demodulator 130 and the analog signal processing unit 140. The input stage 110 provides the received broadcasting signals to the level detector 120, which subsequently provides the signals to the digital stage and the analog stage via the splitter, the SAW filter, etc. The level detector 120 may provide the first automatic gain control signal AGC1 to the evaluation unit 180.

The signal flow illustrated in FIG. 3 indicates that a feedback loop may be formed. The information from the received broadcasting signals at the input stage 110 may be obtained at the digital and analog stages depending on the signal type. The quality information signals Q1 and Q2 also may be obtained and contain information on the interference, multichannel disturbances, SNR, etc for the analog signal and BER, MER, CNR, etc. for the digital signal. The evaluation unit 180 may obtain such information through the signals Q1 and Q2, as well as the second and third automatic gain control signals AGC2 and AGC3. The level detector 120 also may provide the first automatic gain control signal AGC1 that informs the evaluation unit 180 of the level or amplitude of the received signal. Based on all of the received information, the evaluation unit 180 generates the control signals CS1-CS3, which eventually influences the input stage 110, the digital stage and the analog stage. The input stage 110 may amplify the received signal. If the evaluation unit 180 detects the strong neighboring channels in the received signal, the control signal CS1 may limit the amplification at the input stage 110. The control signal CS1 also may provide optimal gain information to the input stage 110. This may allow the best broadcast signal to be used around strong neighboring channels. The control signals CS2 and CS3 also may control the digital stage and the analog stage such that the received signal, either digital or analog, may be properly processed.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A receiver comprising:
   an input stage that receives and amplifies a broadcast signal including a digital broadcast signal and an analog broadcast signal;
   a digital signal processing stage that processes a received digital broadcast signal and outputs a first quality information signal,
   an analog signal processing stage that processes a received analog broadcast signal and outputs a second quality information signal,
   an evaluation unit that evaluates at least one of the first and second quality information signals and outputs a control signal to the input stage, the digital signal processing stage and the analog signal processing stage; and
   a broadband level detector that detects a level of the received broadcast signal and outputs a first automatic gain control signal to the evaluation unit, where the first automatic gain control signal corresponds to the level of the received broadcast signal.

2. The receiver according to claim 1, where the digital signal processing stage outputs a second automatic gain control signal.

3. The receiver according to claim 2, further comprising an analog demodulator that demodulates the analog broadcast signal and outputs a third automatic gain control signal.

4. The receiver according to claim 3, where the evaluation unit further evaluates at least one of the first automatic gain control signal, the second automatic gain control signal and the third automatic gain control signal, and the evaluation unit outputs the control signal for the input stage.

5. The receiver according to claim 1, where the control signal is a variable level control signal.

6. The receiver according to claim 1, where the control signal is a dynamic control signal.

7. The receiver according to claim 1, further comprising a tunable amplifier for amplifying the received digital broadcast signal prior to the demodulation.

8. The receiver according to claim 1, where the input stage is tunable to a desired frequency.

9. The receiver according to claim 1, where the control signal comprises a first control signal and a second control signal and the evaluation unit outputs the first control signal to the input stage and the second control signal to the digital signal processing stage.

10. The receiver according to claim 9, further comprising an analog demodulator that demodulates the analog broadcast signal where the control signal further comprises a third control signal and the evaluation unit outputs the third control signal to the analog demodulator.

11. The receiver according to claim 1, where the first quality information signal and the second quality information signal comprise signal strength information of the received broadcast signal.

12. An input control system, comprising:
    an input circuit that receives a broadcast signal;
    a level detector circuit that detects the level of the broadcast signal and generates a first automatic gain control signal;
    a signal processor that outputs a baseband video signal and generates a second automatic gain control signal and a quality information signal; and,
    an evaluation circuit that generates a first control signal and a second control signal based on the first and second automatic gain control signals and the quality information signal where the first control signal is input to the input circuit.

13. The input control system according to claim 12, where the evaluation circuit outputs the second control signal to the signal processor.

14. The input control system according to claim 13, where the first and the second automatic gain control signal are generated based on the received broadcast signal.

15. The input control system according to claim 14, where the quality information signal is generated based on the received broadcast signal.

16. The input control system according to claim 12, further comprising a splitter that determines whether the broadcast signal is a digital signal or an analog signal.

17. A method for receiving a high frequency signal, comprising:
- at an input stage, receiving and amplifying a broadcast signal including a digital signal and an analog signal;
- processing the received digital signal in a digital signal processing stage and outputting a first quality information signal;
- processing the received analog signal in an analog signal processing stage and outputting a second quality information signal;
- evaluating at least one of the first and second quality information signal with an evaluation unit;
- outputting a control signal to the input stage, the digital signal processing stage and the analog signal processing stage;
- detecting a level of the received broadcast signal with a broadband level detector; and
- outputting a first automatic gain control signal to the evaluation unit.

18. The method according to claim 17, further comprising:
- outputting a second automatic gain control signal from the digital signal processing stage.

19. The method according to claim 18, further comprising:
- demodulating the analog broadcast signal in the analog demodulation stage; and
- outputting a third automatic gain control signal.

20. The method according to claim 19, further comprising:
- evaluating at least one of the level of the broadcast signal, the second automatic gain control signal and the third automatic gain control signal with the evaluation unit;
- linking the first and second quality information signals and the second and third automatic gain control signals; and
- generating the control signal.

21. The method according to claim 17, further comprising amplifying the received digital broadcast signal with a tunable amplifier before it is demodulated.

* * * * *